United States Patent
Min et al.

(10) Patent No.: US 10,598,846 B2
(45) Date of Patent: Mar. 24, 2020

(54) OPTICAL SHEET MODULE CONSISTING OF OPTICAL SHEETS HAVING DIFFERENT THICKNESSES

(71) Applicant: LMS Co., LTD, Pyeongtaek (KR)

(72) Inventors: Jee Hong Min, Seongnam (KR); Young Il Kim, Seongnam (KR); Sung Sik Cho, Suwon (KR); Woo Jong Lee, Osan (KR); Tae Jun Lee, Osan (KR); Hee Jeong Kim, Osan (KR); Yong Jin Kang, Seoul (KR)

(73) Assignee: LMS CO., LTD., Pyeongtaek (KR)

( * ) Notice: Subject to any disclaimer, the term of this patent is extended or adjusted under 35 U.S.C. 154(b) by 0 days.

(21) Appl. No.: 14/410,663

(22) PCT Filed: Jun. 24, 2013

(86) PCT No.: PCT/KR2013/005544
§ 371 (c)(1),
(2) Date: Dec. 23, 2014

(87) PCT Pub. No.: WO2014/003386
PCT Pub. Date: Jan. 3, 2014

(65) Prior Publication Data
US 2015/0301264 A1  Oct. 22, 2015

(30) Foreign Application Priority Data
Jun. 25, 2012 (KR) .................. 10-2012-0068052

(51) Int. Cl.
*F21V 8/00* (2006.01)
*G02B 5/02* (2006.01)
(Continued)

(52) U.S. Cl.
CPC ......... *G02B 6/0053* (2013.01); *G02B 5/0231* (2013.01); *G02B 5/0268* (2013.01);
(Continued)

(58) Field of Classification Search
CPC .... G02B 5/045; G02B 5/0215; G02B 5/0231; G02B 5/3033; G02B 6/0035;
(Continued)

(56) References Cited

U.S. PATENT DOCUMENTS 5,422,756 A * 6/1995 Weber .................... G02B 5/124
                                                                    359/485.03
8,942,522 B2 * 1/2015 Edmonds ............... G02B 5/045
                                                                    385/31
(Continued)

FOREIGN PATENT DOCUMENTS

CN 1791829 A 6/2006
CN 101155690 A 4/2008
(Continued)

*Primary Examiner* — Erin Kryukova
(74) *Attorney, Agent, or Firm* — Hauptman Ham, LLP

(57) ABSTRACT

An optical sheet module consisting of optical sheets having different thicknesses, includes: a first base film having a predetermined thickness and transmitting light from a lower portion thereof through an upper portion thereof; an upper optical sheet formed on the first base film and having a first structural pattern in which the upper optical sheet protrudes upwardly and the cross-sectional area thereof decreases when progressing toward an upper portion thereof; a second based film laminated beneath the upper optical sheet so as to transmit light from a lower portion thereof to the upper optical sheet; and a lower optical sheet formed on the second base film and having a second structural pattern in which the lower optical sheet protrudes toward the upper optical sheet and the cross-sectional area thereof decreases when progressing toward an upper portion thereof. The first base film is relatively thicker than the second base film.

3 Claims, 12 Drawing Sheets

(51) Int. Cl.
*G02B 5/04* (2006.01)
*G02F 1/1335* (2006.01)

(52) U.S. Cl.
CPC .......... *G02B 5/0278* (2013.01); *G02B 5/045* (2013.01); *G02B 6/0036* (2013.01); *G02F 1/133504* (2013.01); *G02F 1/133536* (2013.01); *G02B 5/0215* (2013.01); *G02B 6/0031* (2013.01); *G02B 6/0055* (2013.01); *G02B 6/0065* (2013.01); *G02F 2001/133607* (2013.01)

(58) Field of Classification Search
CPC .... G02B 6/0036; G02B 6/005; G02B 6/0051; G02B 5/0268; G02B 5/0278; G02B 6/0055; G02B 6/0031; G02B 6/0065; G02F 1/133615; G02F 1/133606; G02F 2001/133607; G02F 1/133504; F21V 5/02; F21V 5/02
USPC ........................................... 362/339
See application file for complete search history.

(56) References Cited

U.S. PATENT DOCUMENTS

| | | | | |
|---|---|---|---|---|
| 9,182,523 | B2* | 11/2015 | Sung | G02B 5/0231 |
| 2001/0050736 | A1* | 12/2001 | Lee | G02B 6/0051 |
| | | | | 349/65 |
| 2004/0228106 | A1* | 11/2004 | Stevenson | G02B 5/045 |
| | | | | 362/627 |
| 2007/0223247 | A1* | 9/2007 | Lee | G02B 5/045 |
| | | | | 362/606 |
| 2008/0049330 | A1* | 2/2008 | Tolbert | G02F 1/133606 |
| | | | | 359/599 |
| 2008/0137346 | A1* | 6/2008 | Ohta | G02F 1/13362 |
| | | | | 362/309 |
| 2008/0259243 | A1* | 10/2008 | Ohta | G02B 5/045 |
| | | | | 349/64 |
| 2008/0303975 | A1* | 12/2008 | Mizuno | G02B 5/045 |
| | | | | 349/62 |
| 2009/0097273 | A1* | 4/2009 | Chang | G02B 6/0055 |
| | | | | 362/618 |
| 2009/0322988 | A1* | 12/2009 | Kim | G02B 6/0056 |
| | | | | 349/65 |
| 2010/0020262 | A1* | 1/2010 | Hong | G02B 5/045 |
| | | | | 349/62 |
| 2010/0118513 | A1* | 5/2010 | Shin | G02F 1/133604 |
| | | | | 362/97.1 |
| 2010/0245717 | A1* | 9/2010 | Miyamoto | G02B 6/0051 |
| | | | | 349/65 |
| 2010/0328579 | A1* | 12/2010 | Shim | G02B 5/02 |
| | | | | 349/64 |
| 2011/0110104 | A1* | 5/2011 | Kim | G02B 5/045 |
| | | | | 362/341 |
| 2013/0010234 | A1* | 1/2013 | Sung | G02B 5/0231 |
| | | | | 349/95 |
| 2014/0016208 | A1* | 1/2014 | Edmonds | C09J 133/08 |
| | | | | 359/625 |

FOREIGN PATENT DOCUMENTS

| | | |
|---|---|---|
| CN | 101338875 A | 1/2009 |
| CN | 101688989 A | 3/2010 |
| JP | 2007-087606 A | 4/2007 |
| JP | 2007-155938 A | 6/2007 |
| JP | 2007-502010 A | 1/2011 |
| KR | 10-1004633 B1 | 1/2011 |
| KR | 10-2012-0014460 A | 2/2012 |
| KR | 10-1133637 B1 | 4/2012 |
| WO | WO 2012138495 A1 * | 10/2012 ............ C09J 133/08 |

\* cited by examiner (a)

(b)

OPTICAL SHEET MODULE CONSISTING OF OPTICAL SHEETS HAVING DIFFERENT THICKNESSES

CROSS-REFERENCE TO PRIOR APPLICATIONS

This application is a national Stage Patent Application of PCT International Patent Application No. PCT/KR2013/005544, filed on Jun. 24, 2013 under 35 U.S.C. § 371, which claims priority of Korean Patent Application No. 10-2012-0068052, filed on Jun. 25, 2012, which are all hereby incorporated by reference in their entirety.

TECHNICAL FIELD

The present invention relates to an optical sheet module, and more particularly, to an optical sheet module which prevents wrinkling of an upper optical sheet to improve uniformity and brightness of concentrated light.

BACKGROUND ART

A liquid crystal display device is a display device which is used for a notebook computer, a personal computer, a smart phone, or a television and a characteristic thereof is improved every year in accordance with enlargement of a demand of the liquid crystal display device.

A liquid crystal panel of a liquid crystal display device which is a non-emitting element requires a backlight unit due to its structure. The backlight unit is configured by various optical systems. Further, the backlight unit uses optical films which are periodically arranged in order to improve brightness.

FIG. 1 is a view schematically illustrating a structure of a liquid crystal display device of the related art.

As illustrated in FIG. 1, a backlight unit 10 includes a light emitting source 1, a reflecting plate 2, a light guide plate 3, a diffuser sheet 4, a first optical sheet 5, a second optical sheet 6, and a protecting sheet 7.

The light emitting source 1 is an element which generates visible ray and as for the light emitting source 1, a light emitting diode (LED) and a cold cathode fluorescent lamp (CCFL) may be selectively used.

The light emitted from the light emitting source 1 is incident onto the light guide plate 3 to be progressed while being totally reflected inside the light guide plate 3 and light which is incident onto a surface in the light guide plate 3 at an incident angle which is smaller than a threshold angle is not totally reflected but transmitted to be emitted to an upper side and a lower side.

In this case, the reflecting plate 2 reflects the light which is emitted to the lower side to be re-incident onto the light guide plate 3 to improve optical efficiency.

The diffuser sheet 4 diffuses the light emitted through an upper surface of the light guide plate 3 to uniformize brightness and broaden a viewing angle, so that the light which passes through the diffuser sheet 4 has reduced front emission brightness.

The first optical sheet 5 is configured by a base member 5b and a structural pattern 5a to primarily concentrate and emit light which enters from the diffuser sheet 4 so as to be refracted and vertically incident thereonto.

Further, the structural pattern 5a is integrally formed on an upper surface of the base member 5b to vertically refract and emit light which is incident through the base member 5b.

The structural pattern 5a is generally formed to have a triangular shape and a vertical angle of the triangular shape is generally approximately 90 degrees.

The second optical sheet 6 has the same shape as the first optical sheet 5 and secondarily concentrates and emits the light which is primarily concentrated by the first optical sheet 5 in order to increase brightness thereof.

Here, the first optical sheet 5 and the second optical sheet 6 are integrally bonded such that an extending direction of the structural pattern of the first optical sheet 5 and an extending direction of the structural pattern of the second optical sheet 6 perpendicularly intersect, thereby increasing the brightness.

The protecting sheet 7 is attached onto an upper surface so as to prevent surface damage to the second optical sheet 6.

In the liquid crystal display device of the related art configured as described above, when the first optical sheet 5 and the second optical sheet 6 are bonded, the sheets generally pass through a pair of rollers and then are bonded by applying a pressure thereto.

However, when the first optical sheet 5 and the second optical sheet 6 are bonded by the method, since the first optical sheet 5 is pressurized in a direction of the second optical sheet 6, the first optical sheet 5 is bent due to pressure.

DISCLOSURE

Technical Problem

The present invention has been made in an effort to solve the problem of the optical sheet module of the related art and provide an optical sheet module consisting of optical sheets having different thicknesses which prevents wrinkling of an upper optical sheet at the time of bonding the sheets by increasing a thickness of an upper optical sheet when a pair of optical sheets are bonded.

Technical Solution

According to an aspect of the present invention, there is provided an optical sheet module, including: an upper optical sheet having a first base film which has a predetermined thickness and transmits light transmitted from a lower portion to pass the light through an upper portion and a first structural pattern which is formed on the first base film and upwardly protrudes, so that a cross-sectional area decreases when progressing toward an upper portion thereof; and a lower optical sheet laminated beneath the upper optical sheet and having a second base film which transmits light transmitted from a lower portion to the upper optical sheet and a second structural pattern which is formed on the second base film and protrudes toward the upper optical sheet, so that a cross-sectional area decreases when progressing toward an upper portion thereof, in which a thickness of the first base film is relatively larger than a thickness of the second base film.

Further, the first base film and the second base film may be formed to have uniform thicknesses, respectively.

The first base film may be formed by laminating a plurality of film layers.

An upper end of the second structural pattern may be in contact with a lower portion of the first base film.

The optical sheet module may further include an adhesive layer which is provided between the upper optical sheet and the lower optical sheet to bond the first base film and the second structural pattern.

An upper end of the second structural pattern may be buried in the adhesive layer.

An upper end of the second structural pattern may be in contact with a lower portion of the first base film.

Further, a cross-sectional trace of the first structural pattern or the second structural pattern may be a straight line.

Further, the first structural pattern and the second structural pattern may have the same cross-sectional shape and be formed to extend along a lateral direction.

Here, the upper optical sheet and the lower optical sheet may be disposed such that an extending direction of the first structural pattern and an extending direction of the second structural pattern intersect each other.

The optical sheet module may further include a reflective polarizer which is disposed to be laminated with the lower optical sheet and the upper optical sheet to selectively transmit light in accordance with a polarization state of light transmitted from a lower portion.

Here, the reflective polarizer may be laminated between the upper optical sheet and the lower optical sheet or laminated above the upper optical sheet.

According to another aspect of the present invention, there is provided an optical sheet module including: an upper optical sheet in which a first structural pattern which is formed on an upper surface to upwardly protrude so that a cross-sectional area decreases when progressing toward an upper portion thereof to concentrate light transmitted from a lower portion; and a lower optical sheet which is laminated beneath the upper optical sheet and has a second structural pattern which is formed on an upper surface to protrude toward the upper optical sheet, so that a cross-sectional area decreases when progressing toward an upper portion thereof, to concentrate light transmitted from a lower portion to transmit the light to the upper optical sheet; a distance from a lowest point of the first structural pattern to a lower surface of the upper optical sheet may be longer than a distance from a lowest point of the second structural pattern to a lower surface of the lower optical sheet.

Advantageous Effects

The present invention has the following advantages.

The optical sheet module according to an embodiment of the present invention is configured such that a thickness of the upper optical sheet is larger than a thickness of the lower optical sheet, so that wrinkling that occurs when the upper optical sheet is bonded onto the lower optical sheet is reduced. Specifically, the upper optical sheet and the lower optical sheet have individual base films and the base film of the upper optical sheet which is laminated on the lower optical sheet to be bonded is formed to have a large thickness, so that the wrinkling that occurs on the base film of the upper optical sheet is reduced, thereby improving brightness of transmitted light.

Further, the thickness of the upper optical sheet is increased, so that durability of the optical sheet module where the upper optical sheet and the lower optical sheet are laminated to be bonded is improved.

Furthermore, an adhesive layer which is provided between the upper optical sheet and the lower optical sheet to bond the upper optical sheet and the lower optical sheet is further provided, so that a bonding quality of the upper optical sheet and the lower optical sheet is improved and the durability is increased.

BEST MODE

Figure 1:
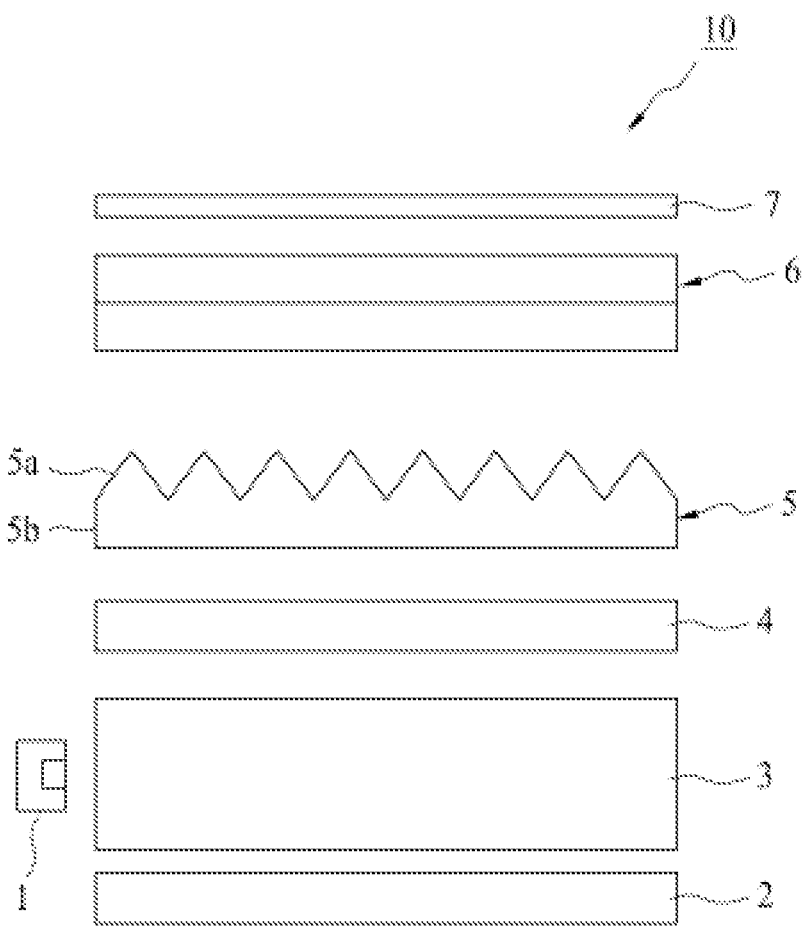
FIG. 1 is a view schematically illustrating a structure of a liquid crystal display device of the related art.

An exemplary embodiment of an optical sheet module of the present invention configured as described above will be described with reference to accompanying drawings. However, this does not limit the present invention to a specific embodiment but provides clearer understanding of the present invention through the embodiment.

Further, in the description of the embodiment, the same name and same reference numeral denote the same component and redundant description thereof will be omitted.

An optical sheet module including optical sheets having different thicknesses according to an embodiment of the present invention may be applied to various fields which change a path of light and an example which is applied to the liquid crystal device will be described in the embodiment.

First, a schematic configuration of an optical sheet module including optical sheets having different thicknesses according to an embodiment of the present invention will be described with reference to FIGS. 2 and 3 as follows.

Figure 2:
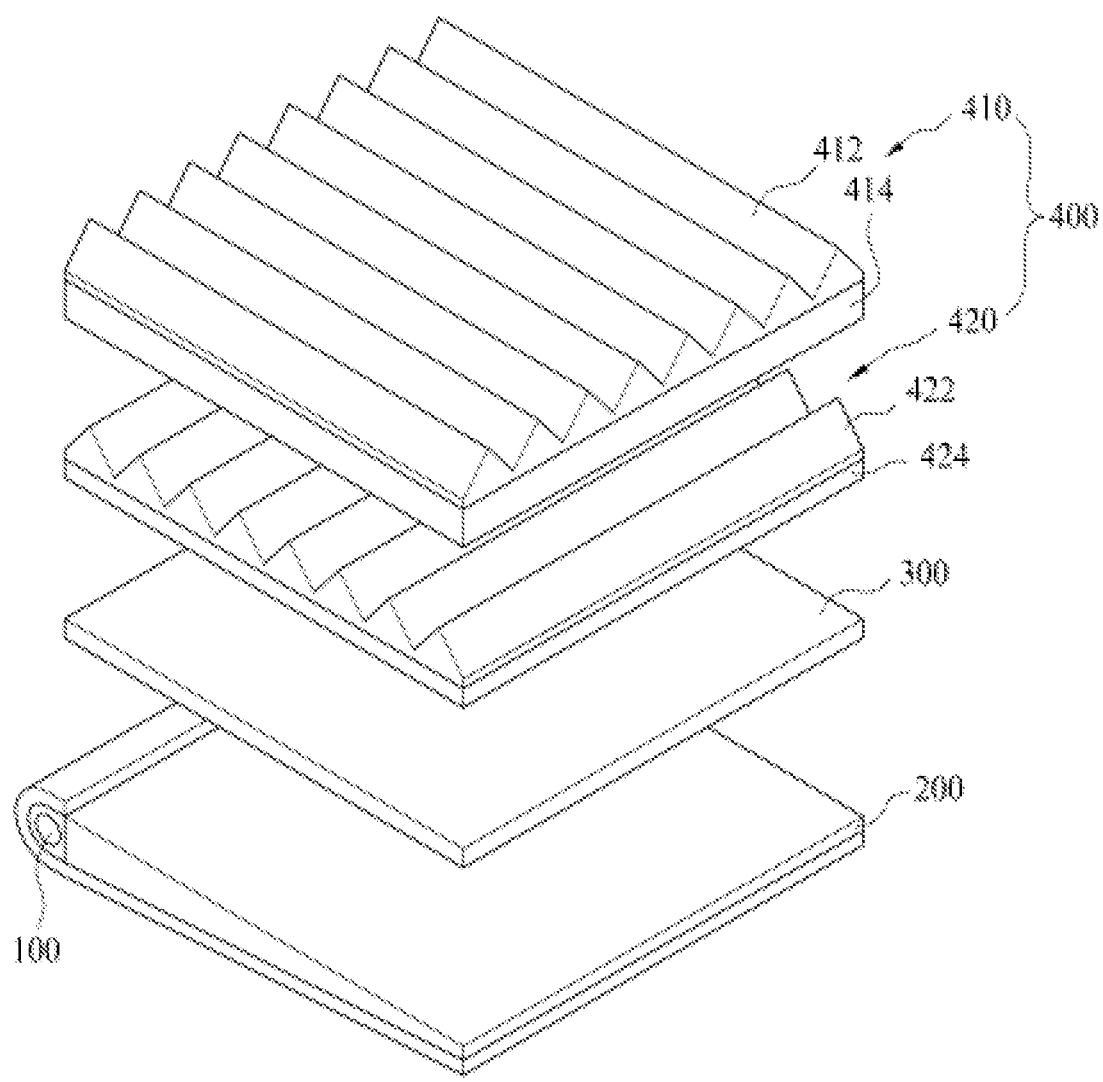
FIG. 2 is an exploded perspective view illustrating a schematic structure of an optical sheet module including optical sheets having different thicknesses according to an embodiment of the present invention.
Figure 3:
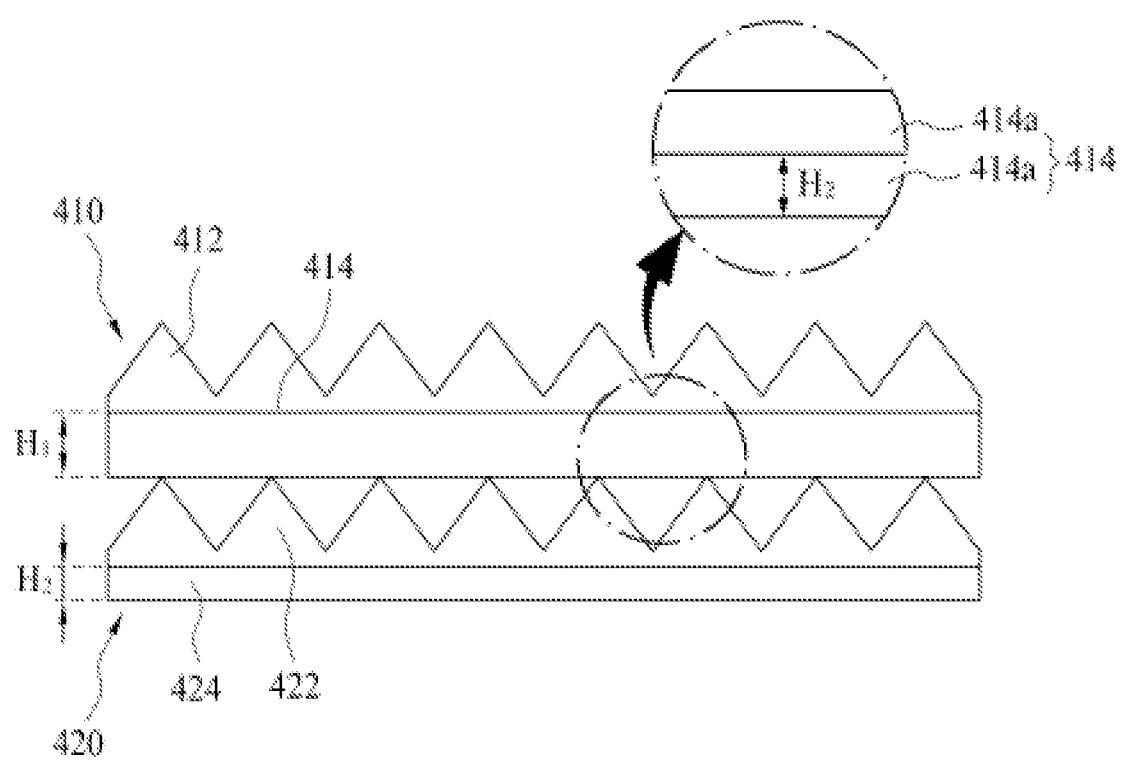
FIG. 3 is a side view illustrating a schematic structure of an optical sheet module including optical sheets having different thicknesses of FIG. 2.

FIG. 2 is an exploded perspective view illustrating a schematic structure of an optical sheet module including optical sheets having different thicknesses according to an embodiment of the present invention and FIG. 3 is a side view illustrating a schematic structure of an optical sheet module including optical sheets having different thicknesses of FIG. 2.

As illustrated in the drawing, when a liquid crystal display device is configured, a backlight unit which supplies light to a liquid crystal panel needs to be necessarily provided. Such a backlight unit is mainly configured by a light source 100, a light guide plate 200, a diffuser sheet 300, and an optical sheet module 400.

The light source 100 is generally configured by a luminous body which emits light and emits light at a side of the light guide plate 200 and transmits the light toward the light guide plate 200.

The light guide plate 200 reflects and scatters the light which is emitted from the light source 100 and transmits the light toward the diffuser sheet 300. The diffuser sheet 300 is disposed above the light guide plate 200 and diffuses the light which is transmitted from the light guide plate 200 to uniformly diffuse the light and transmit the diffused light to the upper portion.

Further, the optical sheet module 400 is disposed above the diffuser sheet 300 to concentrate the transmitted light to upwardly move the light. The optical sheet module 400 is generally configured by a pair of an upper optical sheet 410 and a lower optical sheet 420.

The light is concentrated and refracted in a direction perpendicular to a plane of the optical sheet module 400 by structural patterns formed in the upper optical sheet 410 and the lower optical sheet 420 configured as described above.

According to a detailed configuration of the optical sheet module 400, the optical sheet module 400 is configured by the upper optical sheet 410 and the lower optical sheet 420.

The upper optical sheet 410 is mainly configured by a first base film 414 and a first structural pattern 412. The first base film 414 transmits the light transmitted from a lower portion to transmit the light to an upper portion and has the first structural pattern 412 which is formed on an upper surface thereof so that the transmitted light passes through the first structural pattern 412 to be refracted and concentrated.

The first structural pattern 412 is formed on the upper surface of the first base film 414 to upwardly protrude and has a cross-sectional area which decreases when progressing toward an upper portion. Therefore, the first structural pattern 412 refracts and concentrates light which passes through the first base film 414 to transmit the light to the upper portion.

The upper optical sheet 410 configured as described above refracts and concentrates the light which is transmitted from the lower portion by using the first structural pattern 412 to emit the light toward the upper portion. Generally, the first structural pattern 412 may be formed such that a triangular prism extends along one direction and a plurality of first structural patterns 412 is arranged.

The lower optical sheet 420 is mainly configured by a second base film 424 and a second structural pattern 422 and is disposed below the upper optical sheet 410, so that the second structural pattern 422 is formed on an upper surface of the second base film 424.

Similarly to the first base film 414, the second base film 424 transmits the light transmitted from the diffuser sheet which is disposed on a lower portion to transmit the light to an upper portion and has the second structural pattern 422 which is formed on an upper surface thereof.

Similarly to the first structural pattern 412, the second structural pattern 422 is formed such that a cross-sectional area decreases when progressing toward an upper portion, and is exposed to inside air to refract the light transmitted from the diffuser sheet 300 to transmit the light toward the upper portion.

The lower optical sheet 420 configured as described above is laminated between the diffuser sheet and the upper optical sheet 410 to refract and concentrate light transmitted from the diffuser sheet through the second structural pattern 422 and transmit the light to the upper optical sheet 410.

Here, the first base film 414 and the second base film 424 are formed to have uniform thicknesses, respectively. That is, the first base film 414 and the second base film 424 have different thicknesses but have the same cross-section. The first base film 414 and the second base film 424 are formed to be elongated and have the first structural pattern 412 and the second structural pattern 422 formed on upper surfaces thoseof, respectively.

In the meantime, the first structural pattern 412 and the second structural pattern 422 may have a triangular shape formed such that a pair of extending surfaces which upwardly obliquely extend are provided and upper ends of the extending surfaces meet each other. Cross-sectional traces of the first structural pattern 412 and the second structural pattern 422 may be formed to be straight lines.

However, the illustrated shapes of the first structural pattern 412 and the second structural pattern 422 are not limited to specific shapes and may be selected to easily understand a configuration according to an embodiment of the present invention.

Further, the first base film 414 and the second base film 424 may be formed of a material having high light transmittance so as to transmit light transmitted from the diffuser sheet 300.

The upper optical sheet 410 and the lower optical sheet 420 configured as described above are bonded such that the first structural pattern 412 and the second structural pattern 422 have the same cross-sectional area and extend along a lateral direction and an extending direction of the first structural pattern 412 and an extending direction of the second structural pattern 422 intersect along the lateral direction.

In this case, various angles may be applied as an intersecting angle of the first structural pattern 412 and the second structural pattern 422 and in this embodiment, the first structural pattern 412 and the second structural pattern 422 intersect at approximately 90 degrees to be bonded.

Next, a bonded state of the upper optical sheet 410 and the lower optical sheet 420 will be described with reference to FIG. 3.

FIG. 3 is a side view illustrating a schematic structure of an optical sheet module including optical sheets having different thicknesses of FIG. 2.

The upper optical sheet 410 is configured by the first structural pattern 412 and the first base film 414 and the lower optical sheet 420 is configured by the second structural pattern 422 and the second base film 424.

As illustrated in the drawing, the lower optical sheet 420 is laminated beneath the upper optical sheet 410 and an upward end of the second structural pattern 422 is bonded onto a lower surface of the first base film 414. Here, the first structural pattern 412 and the second structural pattern 422 may be formed to have the same size and the same shape or different sizes and different shapes.

Generally, when the upper optical sheet 410 and the lower optical sheet 420 are bonded, no additional adhesive is provided and the upward end of the second structural pattern 422 is bonded onto the lower surface of the first base film 414 and the upward end of the second structural pattern 422 serves as an adhesive. Further, during a process of bonding the second structural pattern 422 and the first base film 414 to each other, wrinkling may occur on the first base film 414 due to an external force. The process of bonding the second structural pattern 422 onto the lower surface of the first base film 414 will be described below with reference to FIG. 4.

In the meantime, a thickness H1 of the first base film 414 having an upper surface on which the first structural pattern 412 is formed is larger than a thickness H2 of the second base film 424.

As described above, by forming the first base film 414 to have a larger thickness H1 than the thickness H2 of the second base film 424, the first base film 414 is prevented from being bent and wrinkling due to an external force when the first base film 414 is bonded onto the upper portion of the second structural pattern 422.

Further, as illustrated in the drawing, the first base film 414 may be formed by laminating a plurality of film layers 414a having a uniform area. The first base film 414 is formed by laminating the plurality of film layers 414a, so that a thickness of the first base film 414 is increased so as to prevent the bending caused by the external force.

As illustrated in FIG. 3, in the present embodiment, the first base film 414 is formed by laminating a pair of film layers 414a and a thickness H2 of one of the film layers 414c is the same as the thickness H2 of the second base film 424. That is, the thickness H1 of the first base film 414 is approximately twice the thickness H2 of the second base film 424. Here, the film layer 414a is not limited to have the same thickness as the thickness of the second base film 424. Unlike the embodiment of the present invention, the thickness of the film layer 414a may be the same as the thickness of the second base film 424 or different from the thickness of the second base film 424. Further, the thickness H1 of the first base film 414 may be twice larger than the thickness H2 of the second base film 424 or smaller than the thickness H2 of the second base film 424.

As described above, the first base film 414 is formed to be thick, so that bending stiffness is increased to reduce the bending caused by the pressure applied from the external.

Here, when the thickness H1 of the first base film 414 is larger than the thickness H2 of the second base film 424, a total thickness in a state where the upper optical sheet 410 and the lower optical sheet 420 are bonded to each other is not significantly changed. Therefore, the thickness H1 of the first base film 414 which is significantly bent at the time of bonding becomes large, thereby suppressing the increase of the overall thickness to be minimized to prevent the wrinkling.

Of course, when both the thickness H1 of the first base film 414 and the thickness H2 of the second base film 424 are large, the overall durability may be improved and the wrinkling may be reduced. However, the overall thickness is increased and a distance through which light transmitted from the lower portion passes is increased, which may reduce the brightness.

Therefore, the first base film 414 where the bending is mostly generated at the time of bonding the upper optical sheet 410 and the lower optical sheet 420 is formed to have a large thickness H1, thereby suppressing the increase of the overall thickness to be minimized and preventing the wrinkling occurring at the time of bonding the first base film 414.

Next, a process of bonding the first base film 414 onto the upper portion of the lower optical sheet 420 and a state where the first base film 414 is bonded onto the lower optical sheet 420 in accordance with the thickness of the first base film 414 will be described with reference to FIGS. 4 and 5.

Figure 4:
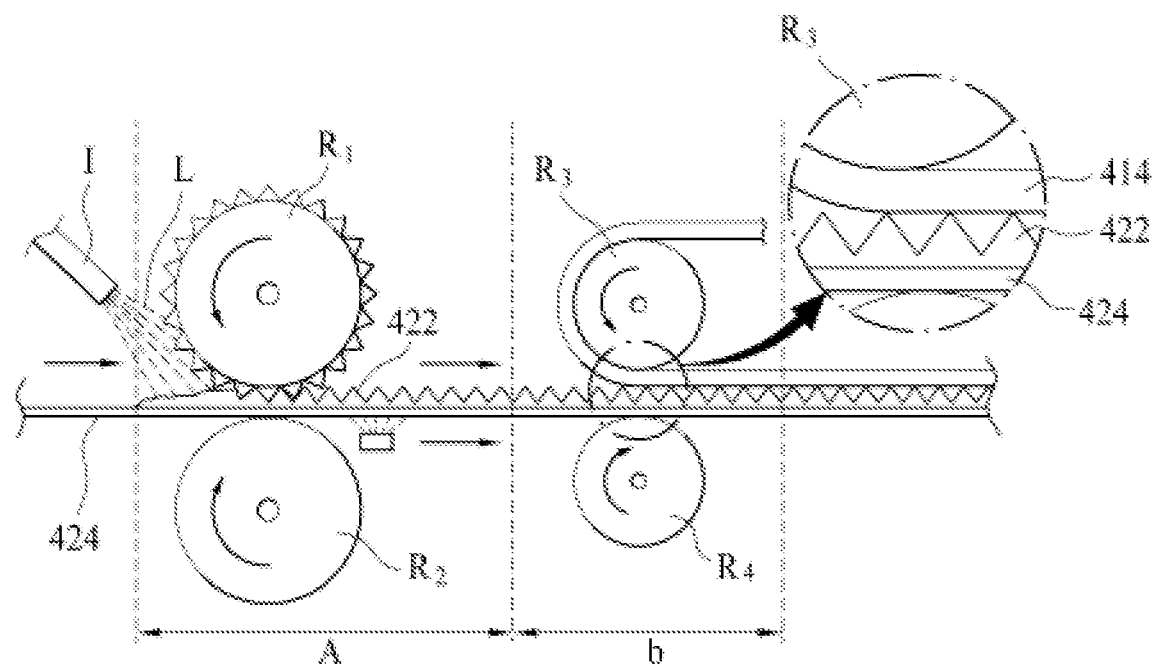
FIG. 4 is a view illustrating a process of bonding optical sheet modules of FIG. 2.
Figure 5:
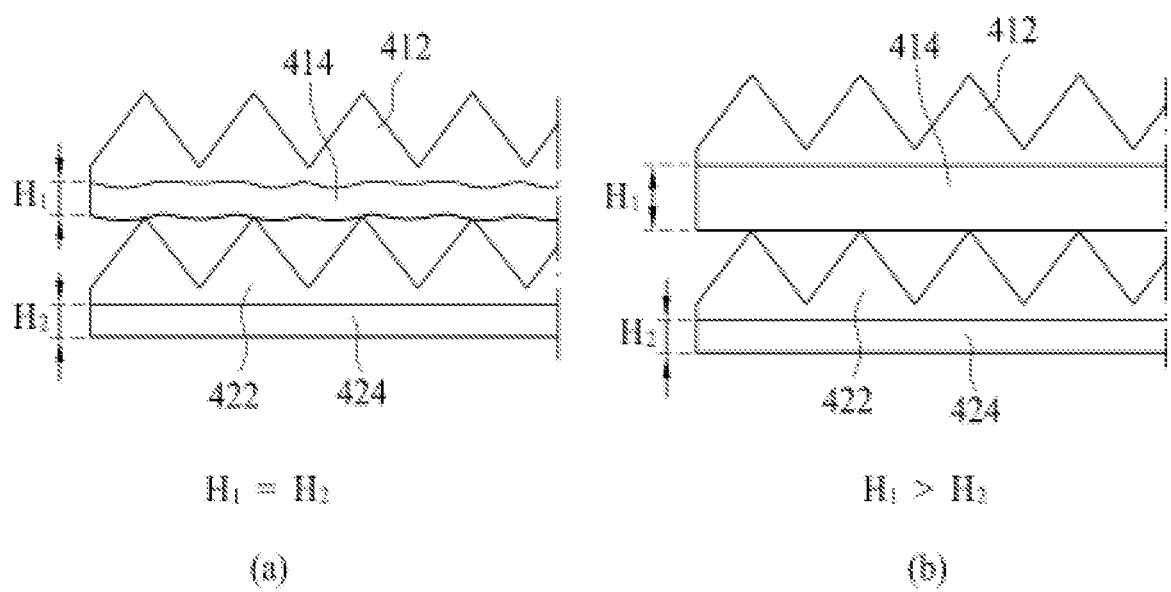
FIG. 5 is a view illustrating a bonded state of an upper optical sheet and a lower optical sheet through the process of FIG. 4.

FIG. 4 is a view illustrating a process of bonding optical sheet modules 400 of FIG. 2 and FIG. 5 is a view illustrating a bonded state of the upper optical sheet 410 and the lower optical sheet 420 through the process of FIG. 4.

First, referring to FIG. 4, an example of a process of bonding the first base film 414 on the upper portion of the second structural pattern 422 after forming the second structural pattern 422 on the second base film 424 will be described.

The second structural pattern 422 is formed on the upper surface of the second base film 424 while the second base film 424 having a predetermined thickness passes through front roller units R1 and R2 in region A. The front roller units R1 and R2 are configured by a first front roller R1 and a second front roller R2 at an upper portion and a lower portion on a path where the second base film 424 is conveyed.

An outer periphery of the first front roller R1 has a predetermined pattern and an end thereof is disposed to be in contact with the upper surface of the second base film 424 and an outer periphery of the second front roller R2 does not have a predetermined pattern and the outer periphery thereof is in contact with the lower surface of the second base film 424.

Further, the second base film 424 is supplied with a liquefied material, which is a raw material of the second structural pattern 422, sprayed from a liquefied material injecting unit I which is separately provided before passing through the front roller units R1 and R2 on a movement path. Next, the liquefied material L which is sprayed on the upper surface of the second base film 424 passes through region A and the second structural pattern 422 is formed by a pattern formed on the first front roller R1.

In this case, the liquefied material L is hardened while passing through the first front roller R1 to form the second structural pattern 422. Here, the liquefied material L is not completely hardened but partially hardened to maintain a predetermined level of a bonding force.

The liquefied material L passes through the first front roller R1 and the second front roller R2 disposed as described above to form the second structural pattern 422 on the upper surface of the second base film 424.

Next, the second base film 424 having the second structural pattern 422 formed on the upper surface moves to region B. In region B, the second base film 424 which is transferred from region A is bonded to the first base film 414 which is supplied from the outside.

The second base film 424 and the first base film 414 are bonded to each other while passing through rear roller units R3 and R4 provided in region B. The rear roller units R3 and R4 are configured by a pair of a first rear roller R3 and a second rear roller R4 and disposed on a path where the first base film 414 and the second base film 424 are bonded and moved.

Therefore, the first base film 414 moves along the first rear roller R3 and bonded to the second base film 424 in region B. A lower surface of the first base film 414 is in contact with the upward end of the second structural pattern 422 which is formed on the upper portion of the second base film 424 and the first base film 414 is pressurized by the first rear roller R3 and the second rear roller R4 to be bonded to the second base film.

In this case, since the second structural pattern 422 is not completely hardened, the upward end of the second structural pattern 422 is bonded to the lower surface of the first base film 414 by the pressure of the rear roller units R3 and R4. The bonded lower optical sheet 420 and first base film 414 pass through region B, so that the second structural pattern 422 is completely hardened to be bonded to the first base film 414.

The upper optical sheet 410 and the lower optical sheet 420 are bonded to each other by the above process.

Next, the bonded state of the upper optical sheet 410 and the lower optical sheet 420 in accordance with the thickness of the first base film 414 will be described below with reference to FIG. 5.

First, referring to FIG. 5A, in a state where the thickness H1 of the first base film 414 is the same as the thickness H2 of the second base film 424, the first base film 414 passes through region B, so that the lower optical sheet 420 is bonded to the first base film 414.

As illustrated in the drawing, the first base film 414 passes between the first rear roller R3 and the second rear roller R4 and is bonded to the second structural pattern 422 by the pressure and wrinkling occurs on the first base film 414. The first base film 414 having the thickness H1 does not resist the pressure generated by pressurizing the rear roller units R3 and R4 at the time of being bonded to the second structural pattern 422 to be bent, which generates the wrinkling. The wrinkling occurs on the first base film 414, so that the upper surface and the lower surface are not regularly formed and have irregular surfaces.

As described above, when the surface of the first base film 414 is not regularly formed and wrinkling occurs thereon, light transmitted from the lower portion is not regularly refracted and concentrated, so that the brightness is lowered.

In the meantime, referring to FIG. 5B, the thickness H1 of the first base film 414 is larger than the thickness H2 of the second base film 424 and the first base film 414 passes through region B, so that the lower optical sheet 420 is bonded to the first base film 414.

As illustrated in the drawing, the first base film 414 passes between the first rear roller R3 and the second rear roller R4 and is bonded to the second structural pattern 422 by the pressure. In this case, when the first base film 414 is bonded to the second structural pattern 422, the wrinkling scarcely occurs. The first base film 414 is formed to have a large thickness H1 so as to resist the pressure applied by the first rear roller R3 and thus even when the first base film 414 passes through region B, the bending is not generated.

As described above, when the wrinkling does not occur on the second base film 424, the surface is uniformly formed to uniformly refract and concentrate light transmitted from the lower portion.

Next, a state when the bending is generated in accordance with the thickness of the base film will be described with reference to FIG. 6.

Figure 6:
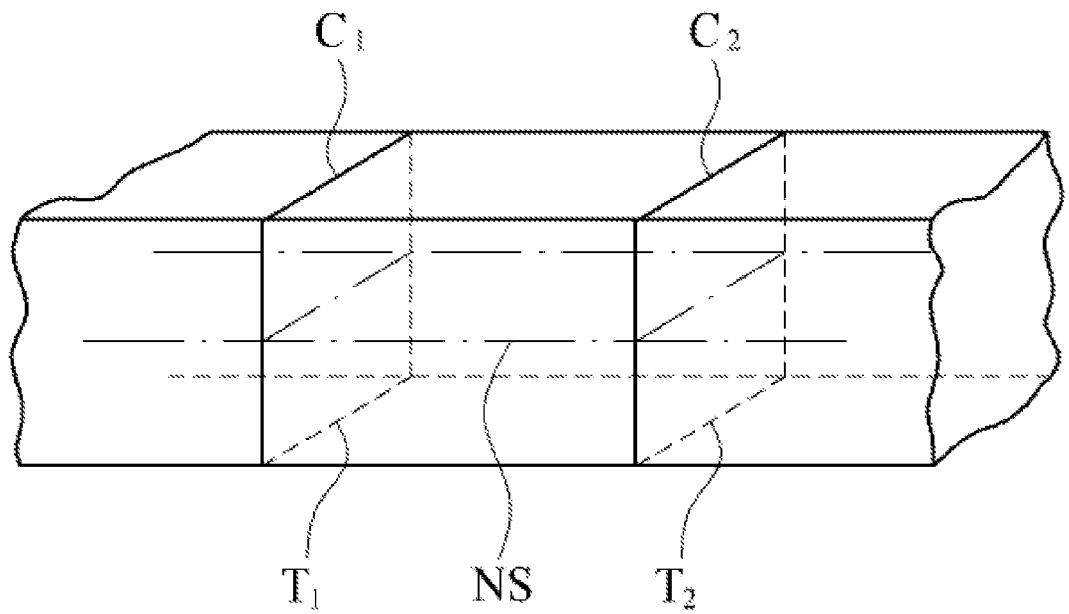
FIG. 6 is a view illustrating a bending degree in accordance with a thickness of a first base film of FIG. 2.
Figure 6:
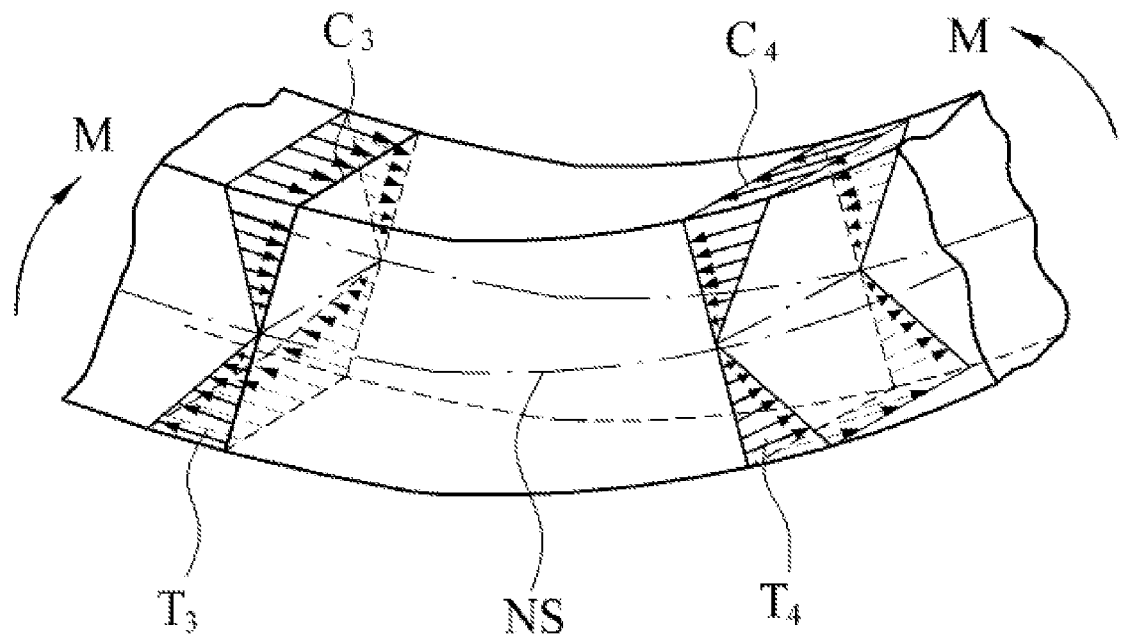

FIG. 6 is a view illustrating a bending degree in accordance with a thickness of the first base film 414 of FIG. 2.

FIG. 6 is a view illustrating a bending stress and as illustrated in FIG. 6A, when no external force is applied, no force is applied to points C1, C2, T1, and T2.

However, as illustrated in FIG. 6B, when bending occurs by the external force applied from the outside, a compressive stress is applied to point C3 and point C4 which are point C1 and point C2 in FIG. 6A. In this case, the applied external force may become a pressurized force by the first rear roller R3 when the first base film 414 and the second structural pattern 422 are bonded.

Here, point C3 and point C4 receive a force which is compressed by the bending with respect to a neutral surface NS for the bending along a thickness direction and the force is increased as being farther from the neutral surface NS for the bending along the thickness direction.

Simultaneously, when the bending occurs by the external force applied as illustrated in FIG. 6B, a tensile stress is applied to points T3 and T4 by the external force.

Similarly, here, points T3 and T4 receive a tensile force which is pulled by the bending with respect to a neutral surface NS for the bending along a thickness direction and the force is increased as being farther from the neutral surface NS for the bending along the thickness direction.

As described above, as points C1 to C4 are distant from the neutral surface NS, a force resistant to the external force is increased, so that when a cross-section area is increased, a force resistant to the external force becomes correspondingly strong. Therefore, as the thickness of the first base film 414 is increased, the first base film 414 is distant from the neutral surface for the bending along the thickness direction and the cross-sectional area is increased and thus bending due to the load from the upper portion is reduced.

According to this principle, as the thickness of the first base film 414 is reduced, the wrinkling at the time of bonding to the lower optical sheet 420 may be reduced.

Next, a modified embodiment of an optical sheet module 400 according to the present invention will be described with reference to FIGS. 7 and 8.

Figure 7:
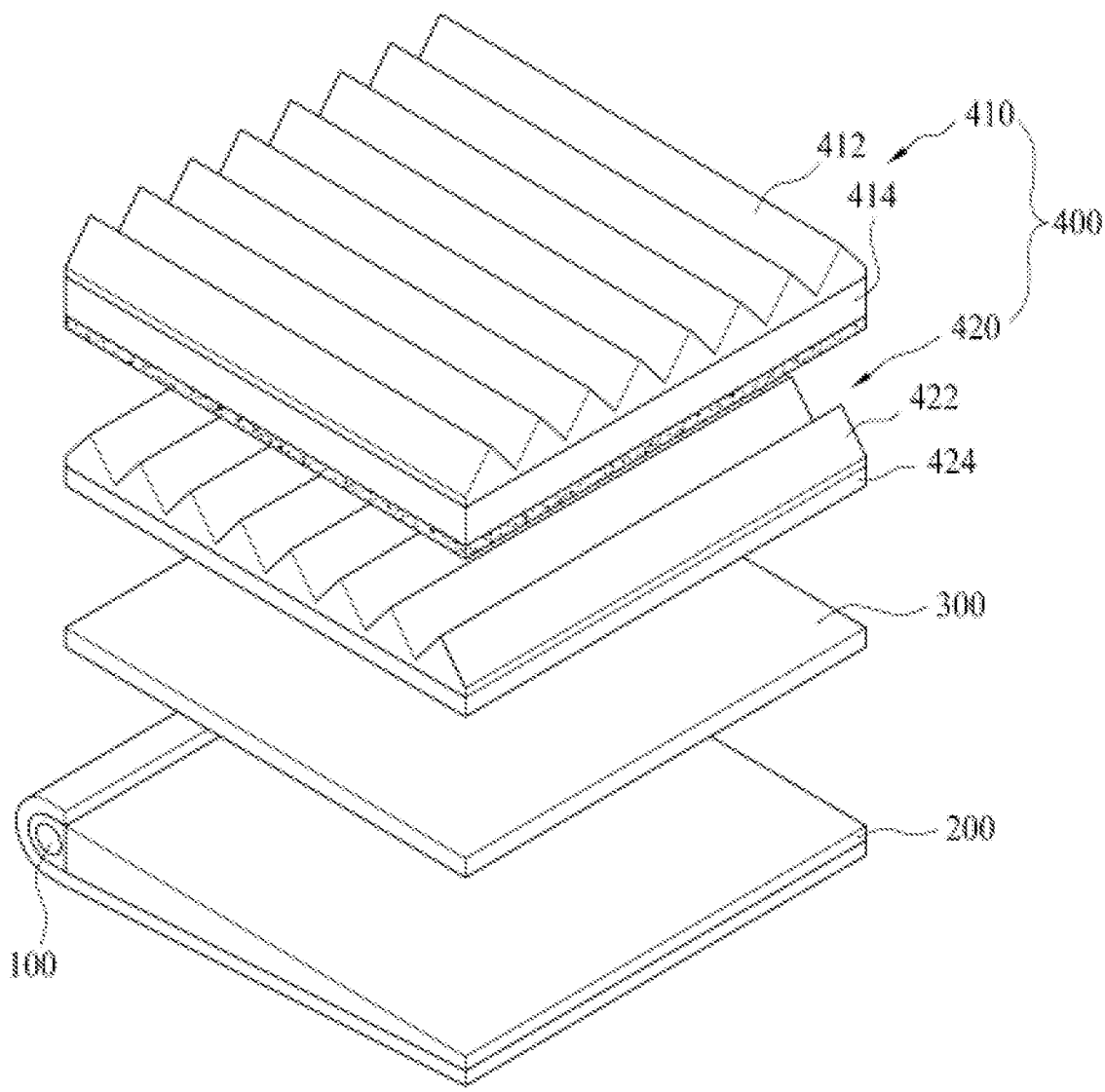
FIG. 7 is an exploded perspective view illustrating a configuration of an optical sheet module of FIG. 2 which further includes an adhesive layer.
Figure 8:
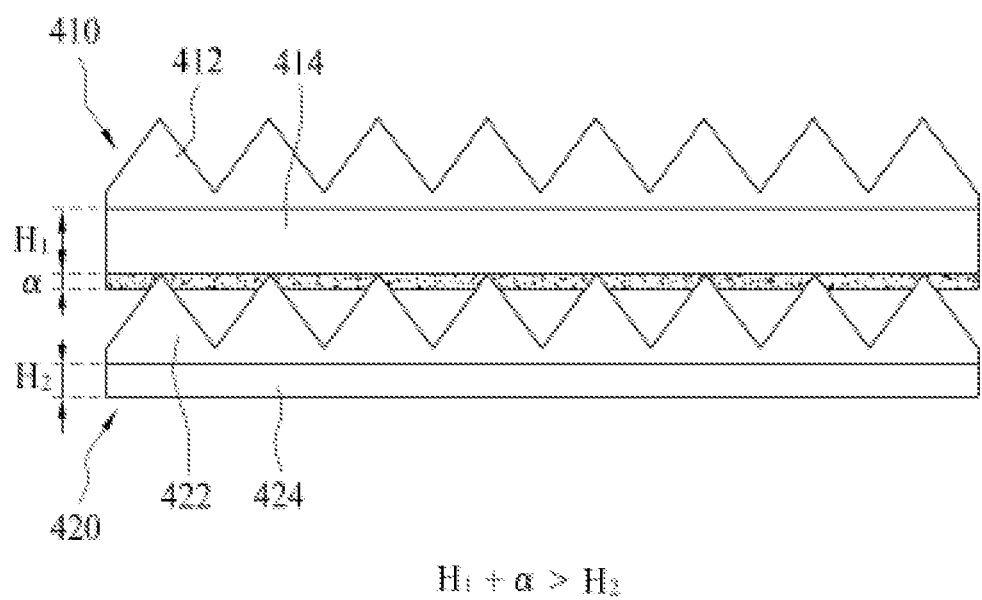
FIG. 8 is a side view illustrating a bonded state of the optical sheet module of FIG. 7.

FIG. 7 is an exploded perspective view illustrating a configuration of an optical sheet module 400 of FIG. 2 which further includes an adhesive layer 430 and FIG. 8 is a side view illustrating a bonded state of the optical sheet module 400 of FIG. 7.

FIGS. 7 and 8 illustrate a state where the upper optical sheet 410 and the lower optical sheet 420 are boned by the adhesive layer 430 and when the liquid crystal display device is configured as illustrated in FIG. 7, the basic configuration is the same but a configuration of the optical sheet module 400 is different.

The optical sheet module 400 is configured to further include a separate adhesive layer 430 in addition to the upper optical sheet 410 and the lower optical sheet 420.

The adhesive layer 430 is provided below the upper optical sheet to bond the lower optical sheet and the upper optical sheet. In this case, the adhesive layer 430 may be formed of a material having high light transmittance so as to transmit light transmitted from the diffuser sheet.

As described above, the optical sheet module 400 is configured to further include the adhesive layer 430, so that when the second structural pattern 422 and the first base film 414 are bonded, the second structural pattern 422 does not act as an adhesive but is inserted into the adhesive layer 430. Therefore, a shape of the upward end of the second structural pattern 422 may be maintained.

Further, by inserting the upward end of the second structural pattern 422 into the adhesive layer 430, a bonded area is increased and thus a bonding quality of the upper optical sheet 410 and the lower optical sheet 420 is increased.

Separately from this, as illustrated in FIG. 8, the adhesive layer 430 is further provided, so that the thickness of the upper optical sheet 410 is increased not only by the thickness H1 of the first base film 414 but also by the thickness of the adhesive layer 430. Therefore, the wrinkling in the first base film 414 when the second structural pattern 422 and the first base film 414 are bonded may be further reduced.

As described above, the optical sheet module 400 may further include a separate adhesive layer 430.

Next, a modified shape of the second structural pattern 422 according to the embodiment of the present invention will be described with reference to FIGS. 9 and 10.

Figure 9:
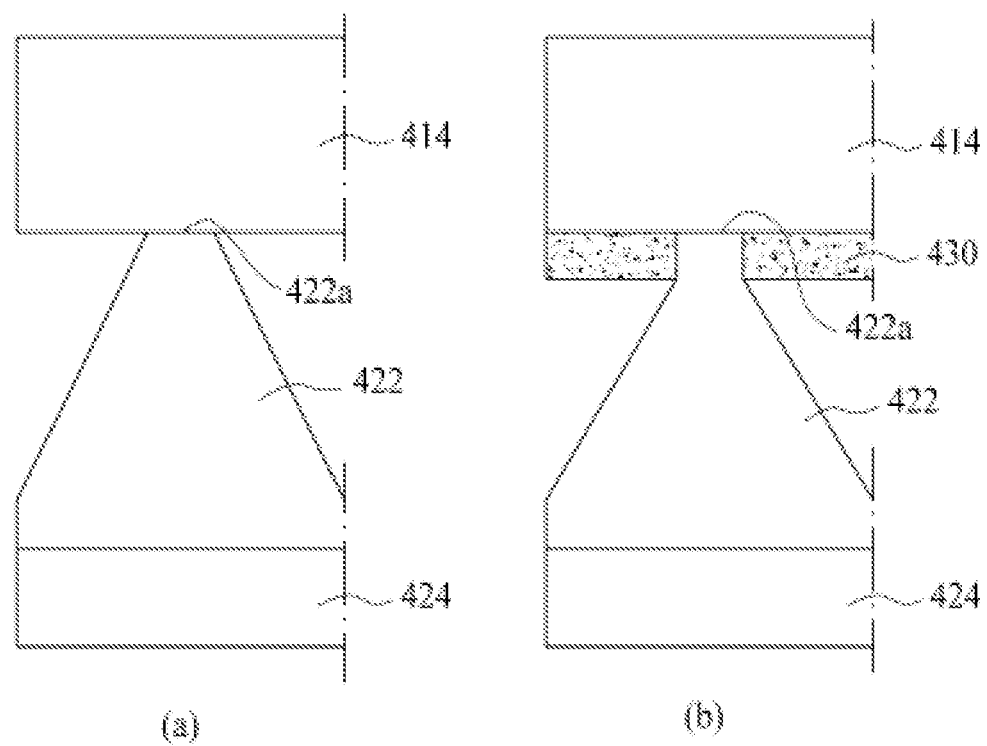
FIG. 9 is a view illustrating a modified shape of a second structural pattern in the optical sheet module of FIG. 2.
Figure 10:
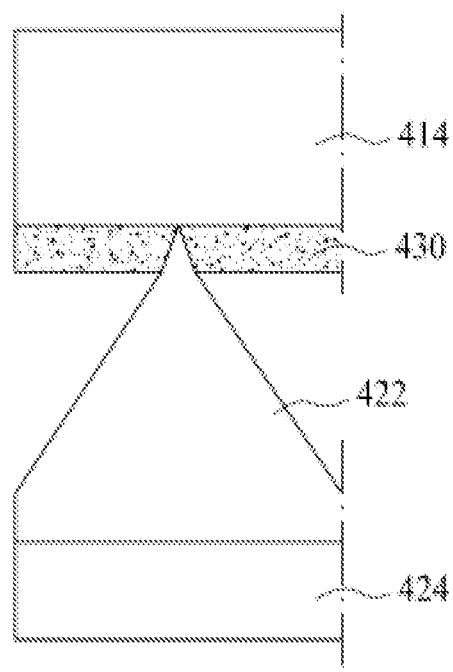
FIG. 10 is a view illustrating another modified shape of a second structural pattern in the optical sheet module of FIG. 2.

FIG. 9 is a view illustrating a modified shape of a second structural pattern in the optical sheet module of FIG. 2 and FIG. 10 is a view illustrating another modified shape of a second structural pattern in the optical sheet module of FIG. 2.

First, FIG. 9A is a view of a state in the second structural pattern 422 having a bonded surface 422a where the upper end along a cross-section trace is in contact with a lower surface of the first base film 414 to perform area contact.

The upper end of the second structural pattern 422 has the bonded surface 422a, so that a bonding quality of the first base film 414 and the lower optical sheet 420 may be increased.

Further, FIG. 9B is a view of a state in the optical sheet module 400 where the upper end of the second structural pattern 422 is buried in the adhesive layer 430 to be bonded with the first base film 414.

As illustrated in FIG. 9B, the upper end of the second structural pattern 422 has a pair of extending surfaces which are buried in the adhesive layer 430 and formed to upwardly extend and a bonded surface 422a whose both ends are connected to the upper ends of the extending surfaces and which is bonded onto the first base film 414.

As illustrated in FIG. 9, the second structural pattern 422 is formed to have the bonded surface 422a to be bonded to the first base film 414, so that the bonding quality of the upper optical sheet 410 and the lower optical sheet 420 may be improved. Further, the extending surfaces are buried in the adhesive layer 430 to be bonded, so that the bonding quality of the upper optical sheet 410 and the lower optical sheet 420 may be further improved.

Next, referring to FIG. 10, as a modified shape of FIG. 9B, no additional bonded surface 422a is provided, the upper end of the second structural pattern 422 is buried in the adhesive layer 430, and a pair of extending surfaces upwardly extending meet at a top portion.

As described above, the second structural pattern 422 includes a pair of extending surfaces and the upper end thereof is formed to have a triangular shape, so that the upper end of the second structural pattern 422 is buried in the adhesive layer 430, thereby increasing the bonding quality.

Further, as illustrated in FIG. 10, a gradient angle of the cross-section trace of the upper end of the second structural pattern 422 is larger than a gradient angle of the cross-sectional trace of the lower portion, so that a refracting angle of light which is incident from the lower portion and refracted into the adhesive layer 430 may be adjusted.

As described above, the gradient angle of the upper end of the second structural pattern 422 is different from the gradient angle of the lower portion, so that even though the upper end of the second structural pattern 422 is buried in the adhesive layer 430, the light incident onto the second structural pattern 422 is refracted to be close to the perpendicular direction to be transmitted to the upper portion.

Next, a configuration of an optical sheet module according to an embodiment of the present invention which further includes a separate reflective polarizer will be described with reference to FIGS. 11 and 12.

Figure 11:
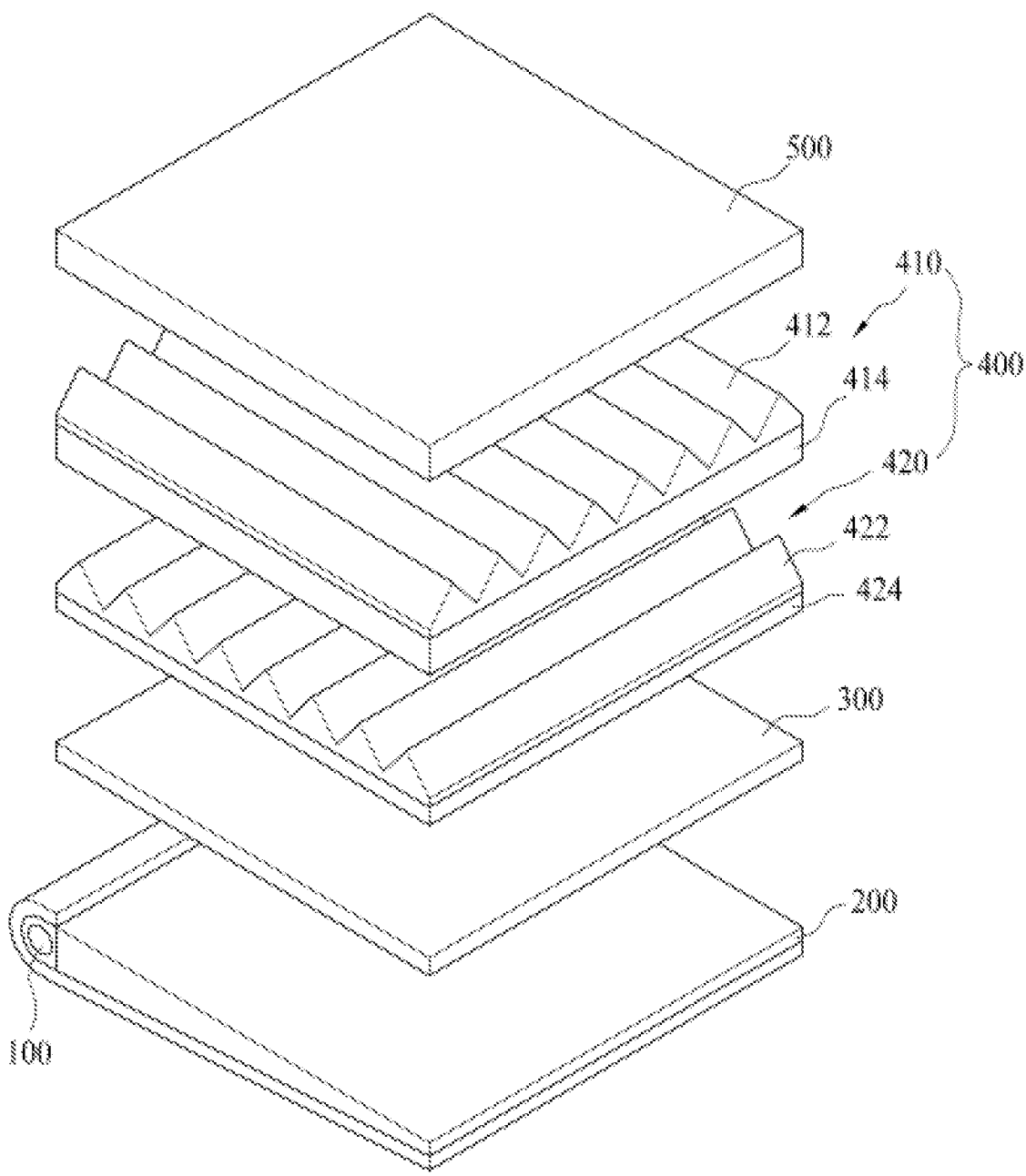
FIG. 11 is an exploded perspective view illustrating a state of an optical sheet module of FIG. 2 which further includes a reflective polarizer.
Figure 12:
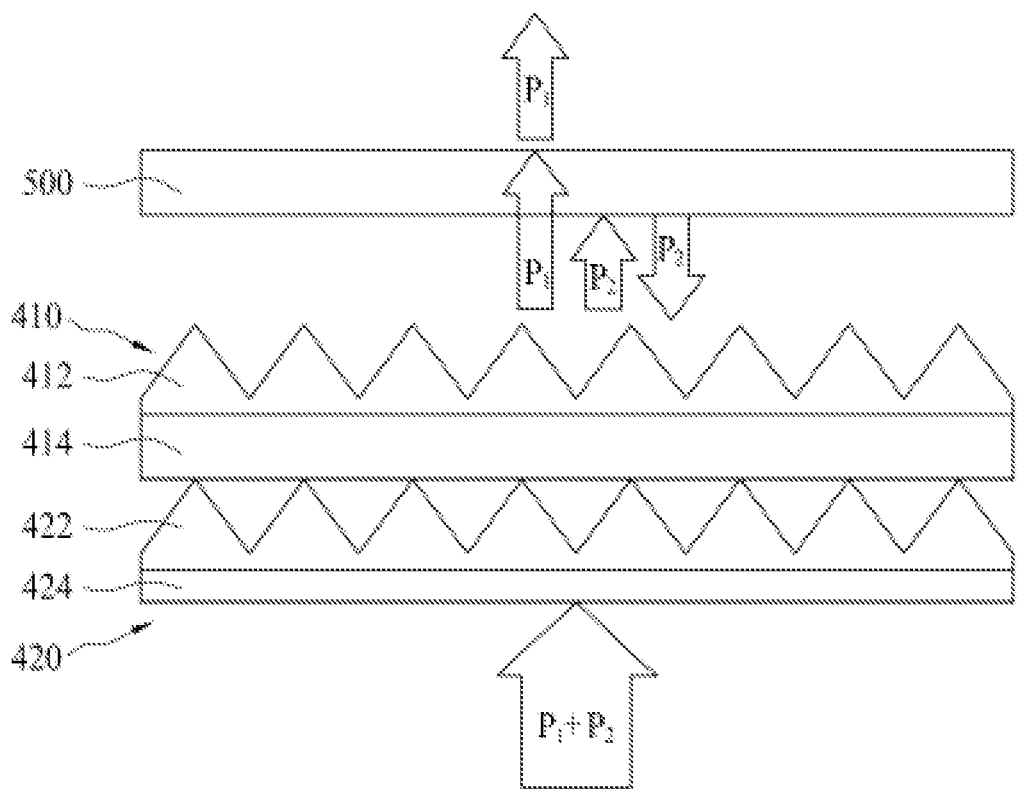
FIG. 12 is a view illustrating a state where light is transmitted or reflected by the reflective polarizer of FIG. 11.

FIG. 11 is an exploded perspective view illustrating a state of an optical sheet module of FIG. 2 which further includes a reflective polarizer and FIG. 12 is a view illustrating a state where light is transmitted or reflected by the reflective polarizer of FIG. 11.

Referring to the drawings, a separate reflective polarizer 500 is further included in the upper portion of the upper optical sheet 410 to be laminated thereon, so that the light concentrated by the upper optical sheet 410 and the lower optical sheet 420 is selectively transmitted.

The reflective polarizer 500 serves to selectively transmit light in accordance with the polarization state of the light and return light having a different polarization state to the light guide plate 200. An example of the above device is a dual brightness enhancement film (DBEF).

The light which does not pass through the DBEF but is reflected is re-reflected by the light guide plate 200 below the BLU to be directed to the upper portion. The DBEF continuously and repeatedly serves to pass through only light having a proper polarization state among the light and reflect the remaining light.

By repeating the above process, only light having a desired polarization state is upwardly emitted, so that loss of the emitted light is reduced and brightness of a display module is increased.

More specifically, as illustrated in FIG. 12, the reflective polarizer 500 is laminated on the upper optical sheet 410, so that the light which passes through the lower optical sheet 420 and the upper optical sheet 410 to be concentered is directed to the reflective polarizer 500. In the light directed to the reflective polarizer 500, light having various polarization states is mixed and light of P1 having a polarization state which is transmitted by the reflective polarizer 500 and light of P2 having a polarization state which is not transmitted by the reflective polarizer 500 are included.

As illustrated in the drawing, the light which transmits the upper optical sheet 410 and the lower optical sheet 420 is in a mixed state of P1 and P2 but the reflective polarizer 500 transmits only light of P1 but downwardly reflects the light of P2 again.

Therefore, the light of P1 is emitted to the outside but the light of P2 is reflected to return to the lower portion and then reflected by the light guide plate 200 to move to the upper portion again. By this process, a progress direction and the polarization state of the light of P2 are changed and the process is repeated so that the light is converted to be appropriately transmitted by the reflective polarizer 500 through the repetition thereof.

As described above, the reflective polarizer 500 is provided, so that loss of light is reduced and light having a desired refracting angle and a desired polarization state is emitted to the upper portion, thereby increasing brightness of the display module.

In the meantime, the reflective polarizer 500 may be laminated on the upper optical sheet 410 and also laminated between the upper optical sheet 410 and the lower optical sheet 420.

Although the exemplary embodiments of the present invention have been described above, the present invention may be embodied in other ways in addition to the above-described embodiments without departing from the gist or the scope of the present invention. Therefore, it should be understood that the embodiment is not limited to a specific example but is illustrative and thus the present invention is not limited to the above-described embodiment but may be modified within the scope of the accompanying claims and the equivalent range.

The invention claimed is:

1. An optical sheet module, comprising:
   an upper optical sheet having a first base film which consists of a single layer of film with a predetermined thickness and a first structural pattern which is formed on the first base film and upwardly protrudes, so that a cross-sectional area of the first structural pattern decreases as the first structural pattern progresses toward a direction of protrusion;
   a lower optical sheet laminated beneath the upper optical sheet and having a second base film and a second structural pattern which is formed on the second base film and protrudes toward the upper optical sheet, so that the cross-sectional area of the first structural pattern decreases as the first structural pattern processes toward the direction of protrusion; and
   an adhesive layer which is provided between the upper optical sheet and the lower optical sheet to bond the first base film and the second structural pattern,
   wherein the predetermined thickness of the first base film is larger than a thickness of the second base film, wherein an upper portion of the second structural pattern is completely buried in the adhesive layer, a lower portion of the second structural pattern is exposed from the adhesive layer, and an upper end of the second structural pattern is directly attached to a lower surface of the first base film, wherein a gradient of a cross-section trace of the upper portion of the second structural pattern is larger than a gradient of a cross-section trace of the lower portion of the second structural pattern, and wherein the upper end of the second structural pattern forms a flat surface so that the flat surface of the second structural pattern is in area contact with the lower surface of the first base film.

2. The optical sheet module of claim 1, wherein the first base film and the second base film are formed to have uniform thicknesses, respectively.

3. The optical sheet module of claim 1, further comprising:

a reflective polarizer which is disposed to be laminated with the lower optical sheet and the upper optical sheet to selectively transmit light in accordance with a polarization state of light transmitted from a lower portion.

* * * * *